(12) United States Patent
Mainero

(10) Patent No.: US 11,503,771 B2
(45) Date of Patent: Nov. 22, 2022

(54) MECHANISM FOR TYING EDGES OF ROLL BALES

(71) Applicant: CARLOS MAINERO Y CIA. S.A.I.C.F.I., Córdoba (AR)

(72) Inventor: Carlos Oscar Mainero, Córdoba (AR)

(*) Notice: Subject to any disclaimer, the term of this patent is extended or adjusted under 35 U.S.C. 154(b) by 797 days.

(21) Appl. No.: 16/509,199

(22) Filed: Jul. 11, 2019

(65) Prior Publication Data

US 2020/0015428 A1   Jan. 16, 2020

(30) Foreign Application Priority Data

Jul. 12, 2018 (AR) .............................. 20180101938

(51) Int. Cl.
*A01F 15/14* (2006.01)
*A01F 15/07* (2006.01)

(52) U.S. Cl.
CPC ............ *A01F 15/141* (2013.01); *A01F 15/07* (2013.01)

(58) Field of Classification Search
CPC .......... A01F 2015/072; A01F 2015/075; A01F 2015/0755; A01F 15/071; A01F 15/0715; A01F 2015/0725; A01F 2015/073
See application file for complete search history.

(56) References Cited

U.S. PATENT DOCUMENTS

| 5,230,193 | A | * | 7/1993 | Underhill | ............ A01F 15/0715 53/556 |
| 5,483,785 | A | * | 1/1996 | DiCarlo | ................ A01F 15/071 53/215 |

FOREIGN PATENT DOCUMENTS

EP            1872648 A1 *  1/2008  ......... A01F 15/0715

* cited by examiner

*Primary Examiner* — Jessica Cahill
*Assistant Examiner* — Bobby Yeonjin Kim
(74) *Attorney, Agent, or Firm* — Egbert, McDaniel & Swartz, PLLC

(57) ABSTRACT

A mechanism for tying roll bales, which allows tying and protecting the edges of the roll bales during the tying process, ensuring that the geometry thereof is kept throughout time.

8 Claims, 4 Drawing Sheets

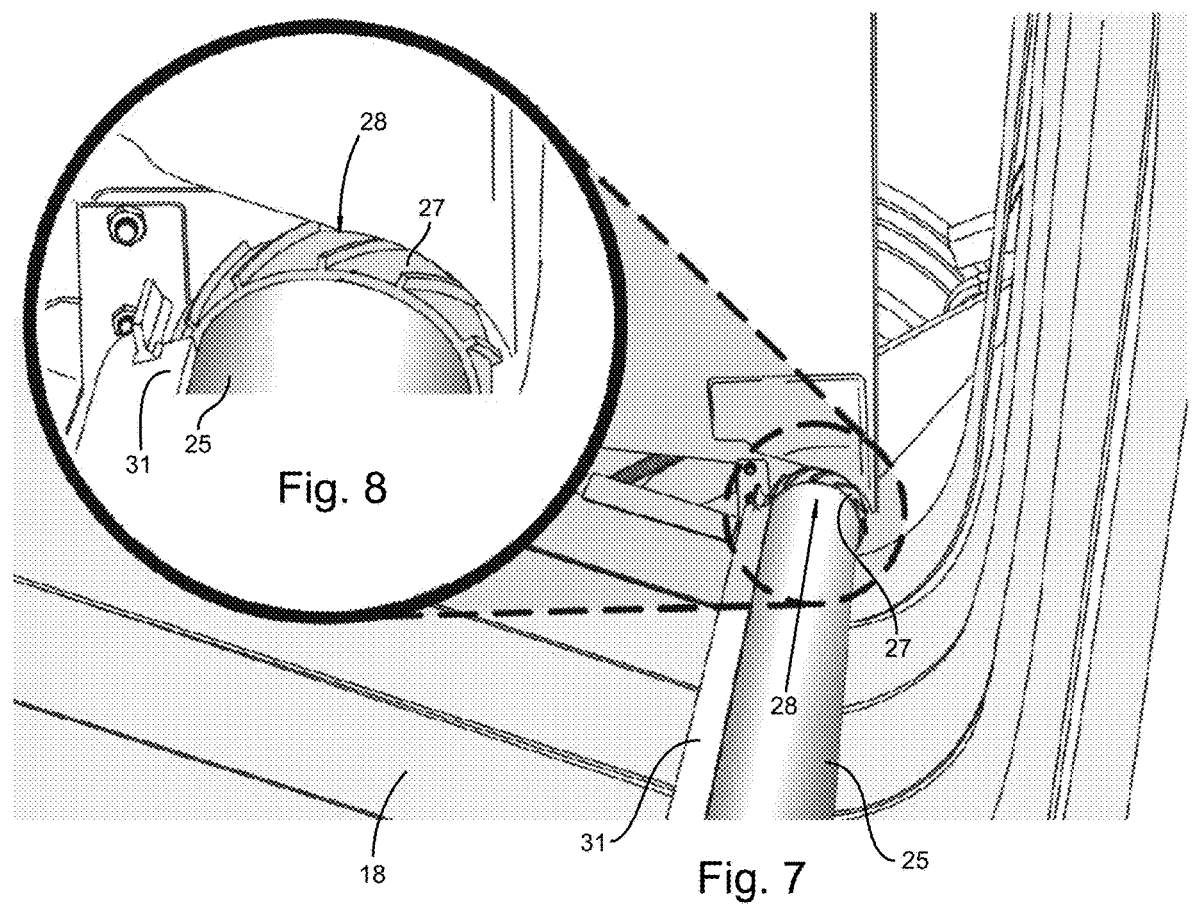

MECHANISM FOR TYING EDGES OF ROLL BALES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention refers to the field of machines, means or arrangements used in agroindustry, and more specifically to a mechanism for tying bales which, unlike conventional tying mechanisms, allows covering and tying the edges of roll bales for keeping the geometry thereof throughout time. Even when in this description reference is made to a mechanism for tying edges of roll bales in round baler machines, it is made clear that the subject-matter of the present invention may be considered, adapted and used in any type of round baler machine without any inconveniences.

2. Description of Related Art Including Information Disclosed Under 37 CFR 1.97 and 37 CFR 1.98

At present, it is widely known that bales are used to preserve crops intended for forage, which is cut and processed before drying, as a form of keeping its maximum nutritional performance. In general, round baler machines used for making bales comprise a forage collector arranged on a front and low portion of the round baler, a compaction chamber wherein the roll is formed and compacted, a wrapper that allows tying the roll to keep it with the desired geometry, and an end bale expulsion system.

This equipment is supplied with mechanical and hydraulic energy from an independent propelling vehicle such as a tractor, and the operation of the baler equipment is conducted from the tractor's cabin through mechanical elements or electronically. In these machines, a tying material provided with a mechanism associated with the bale is commonly used in the art of tying bales, and is introduced into the baler chamber from a source during the tying cycle. The tied material is cut by another mechanism at the end of the tying cycle, leaving the material ready for the next cycle.

Conventionally, the materials used for tying a bale into a roll are lightweight and thin, for which reason the shift in the inertia time in the material coil from where the feeding mechanism is supplied shows large variations from the initial condition of new coil to the final condition when the tying material coil is almost empty. Initially, the tying of bales was done with thread turns, and later on with plastic material in the form of a net, always being desirable that bales kept their cylindrical shape after being formed, for ease of transport, storage and conservation.

It is known in the art of tying bales into rolls that the tying is done by tensioning the tying material elastically for it to be adhered to the surface of the roll bale. As mentioned above, it is of utmost importance to keep the form of the roll bale to ease transport, storage and conservation. Keeping the shape of the roll bale depends on the tension employed in tying the roll. If the tension is not sufficient, the roll may break the tying material net due to the pressure exerted thereon, causing disintegration and subsequent loss. In addition, it is of utmost importance that in the roll bales also the edges are tied and protected for ensuring further keeping their geometry throughout time.

Although some conventional mechanisms have been developed for tying the edges of roll bales, in practice there are still certain inconveniences that do not guarantee a suitable, correct and effective tying to allow keeping the geometry of the roll throughout time.

By reason of the above, it is convenient to have a new arrangement, device or machine that allows the tying and protection of the edges of the roll bales in order to ensure that the geometry thereof is kept throughout time.

BRIEF SUMMARY OF THE INVENTION

It is therefore an object of the present invention to provide a new mechanism for the tying and protection of edges of roll bales.

It is a further object of the present invention to provide a mechanism for the tying and protection of the edges of roll bale that allows keeping the geometry thereof throughout time.

It is yet a further object of the present invention to provide a traction roller the width of which is greater than the width of the baler-compaction chamber so as to conduct the tying and protection of the roll edges during the tying process.

It is a further object of the present invention to provide said traction roller respective edges with helicoid arrangements the height of which is above the flexible belt that passes and is mounted between the formation rolls.

It is yet a further object of the present invention to provide a tying mechanism having a spiraled bar the ends of which are provided with corresponding threads that keep the net extended on its side extension.

It is yet a further object of the present invention to provide a mechanism of tying the edges of rolls bales, used in baler machines of the type having a chassis with side walls, a forage collector mechanism in communication with a baler-compacting chamber provided with a roll formation mechanism, a tying arrangement having a net spool arranged transversely to the machine's forward sense and provided with a tying material that circulates therefrom towards the baler-compaction chamber and an expulsion arrangement for the formed bale, being the mechanism that comprises at least one extension or stretching spiraled bar arranged on the lower part of said tying arrangement, which receives the tying material from the net spool and having a plurality of helicoid threads; at least one feeding roller arranged nearby said spiraled bar and that receives the tying material from this latter; and at least one traction roller arranged adjacent to an entry of the baler-compaction chamber and which receives the tying material from the feeding roller, said traction roller bearing a length higher than the width of the baler-compaction chamber.

BRIEF DESCRIPTION OF THE SEVERAL VIEWS OF THE DRAWINGS

For better clarifying and understanding, the present invention is illustrated in several figures that represent the invention in one of its preferred embodiments, by way of example, wherein:

FIG. 7 shows a perspective view of a portion of the tying mechanism of the present invention; and FIG. 8 shows an enlarged view of the portion of the tying mechanism of FIG. 7.

DETAILED DESCRIPTION OF THE INVENTION

Making now reference to the figures, it is observed that the invention consists on a new mechanism for tying bales into rolls, which allows also tying and protecting the edges of the roll bale during the tying process, ensuring that the geometry thereof is kept throughout time.

Figure 1:
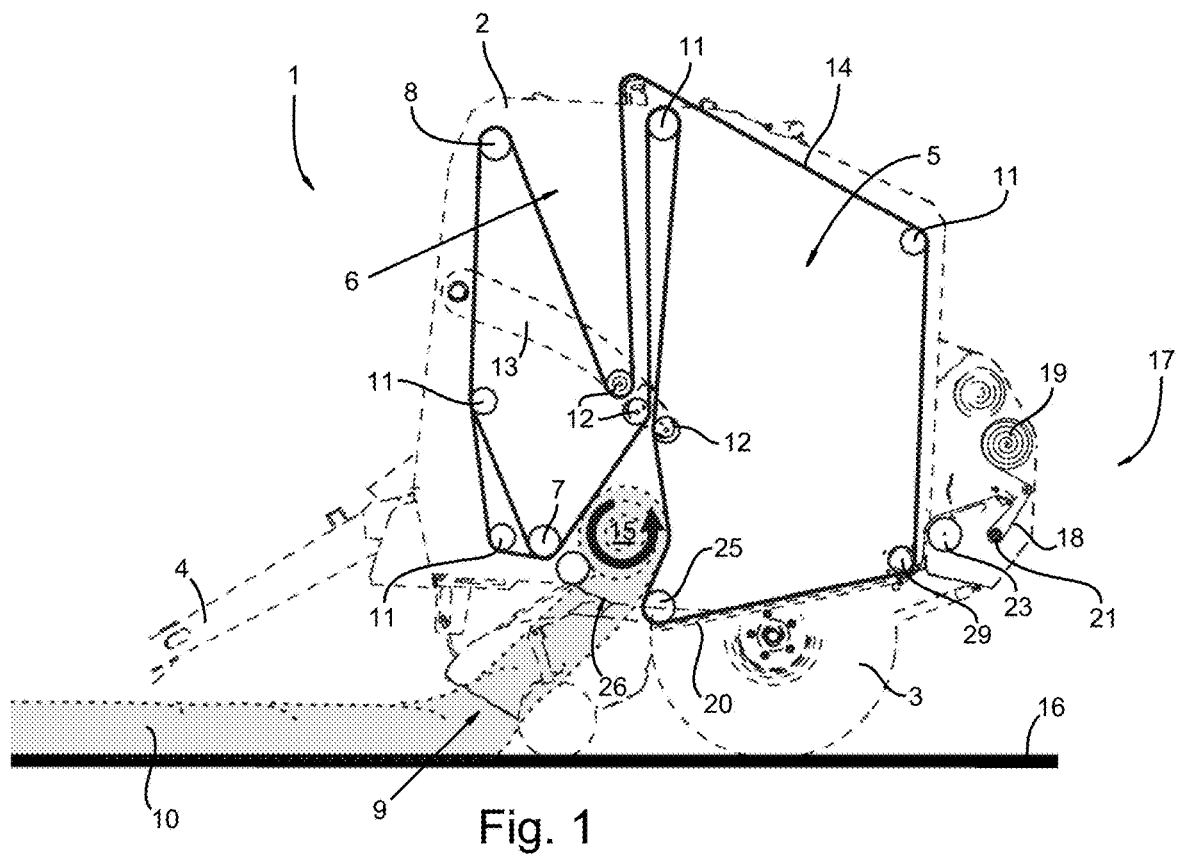
FIGS. 1 to 4 show a partial and side cutaway view of a round baler machine wherein the tying mechanism of roll bale edges according to the present invention is mounted, showing the formation sequence of a roll bale.
Figure 2:
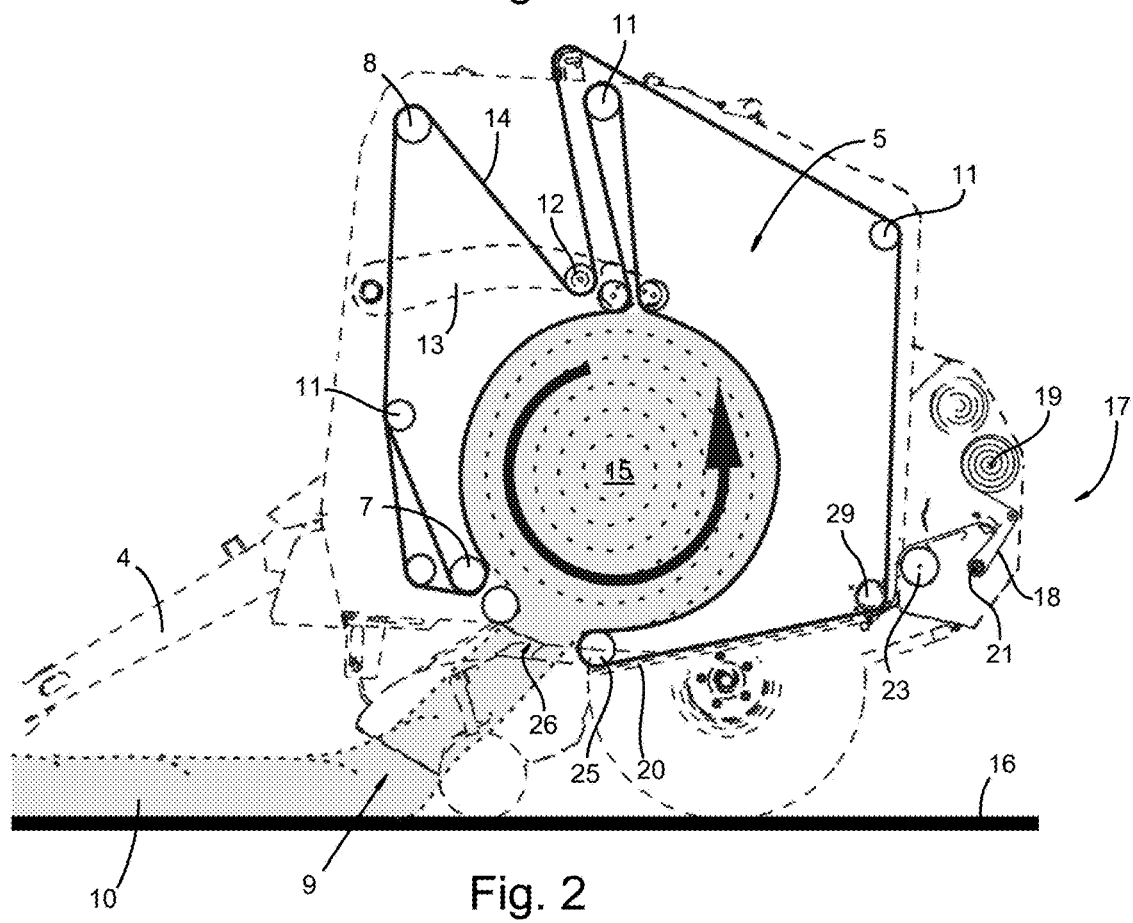
Figure 3:
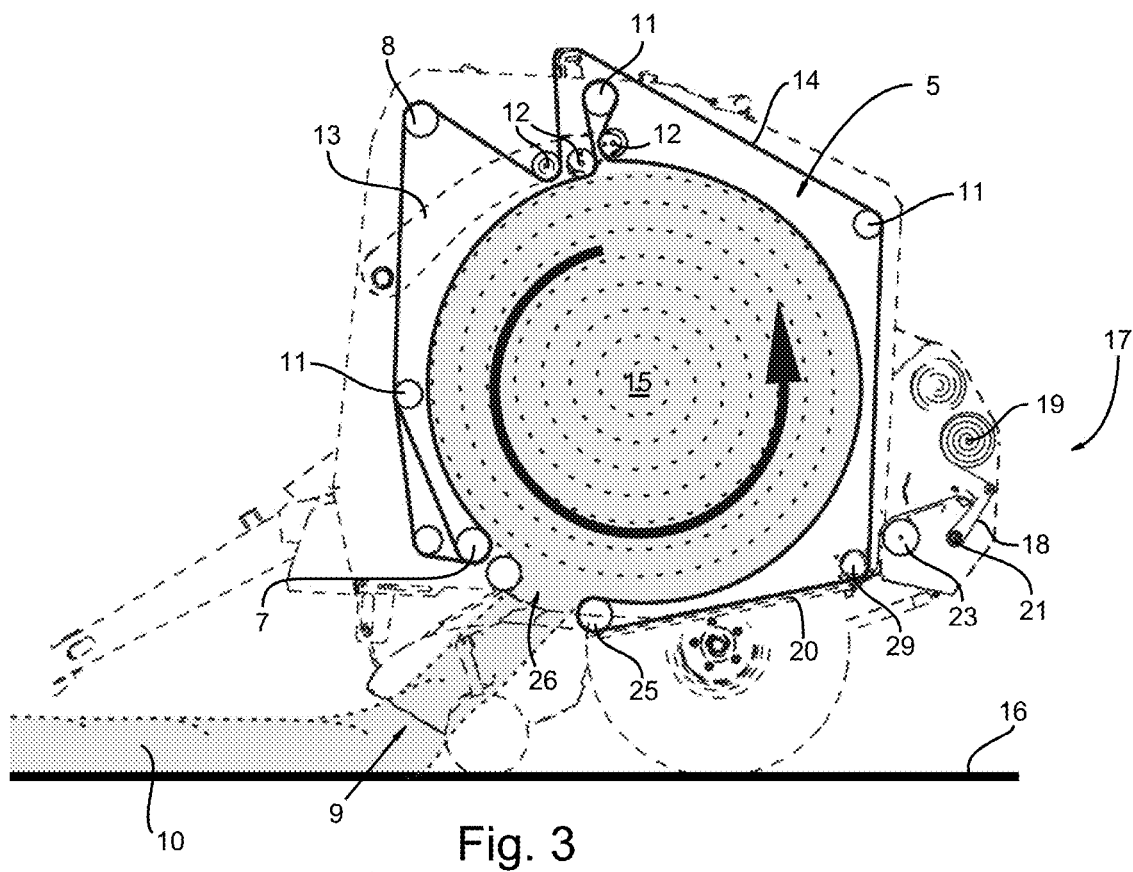
Figure 4:
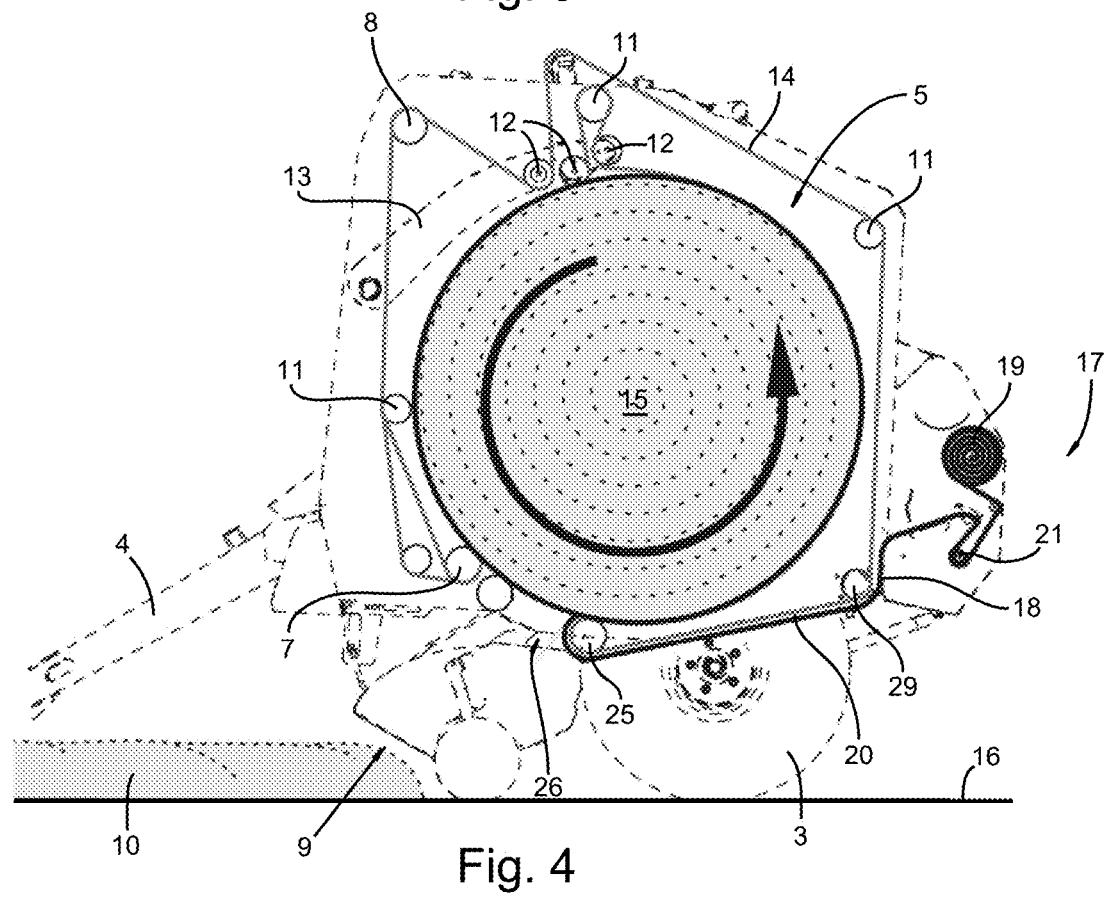
Figure 5:
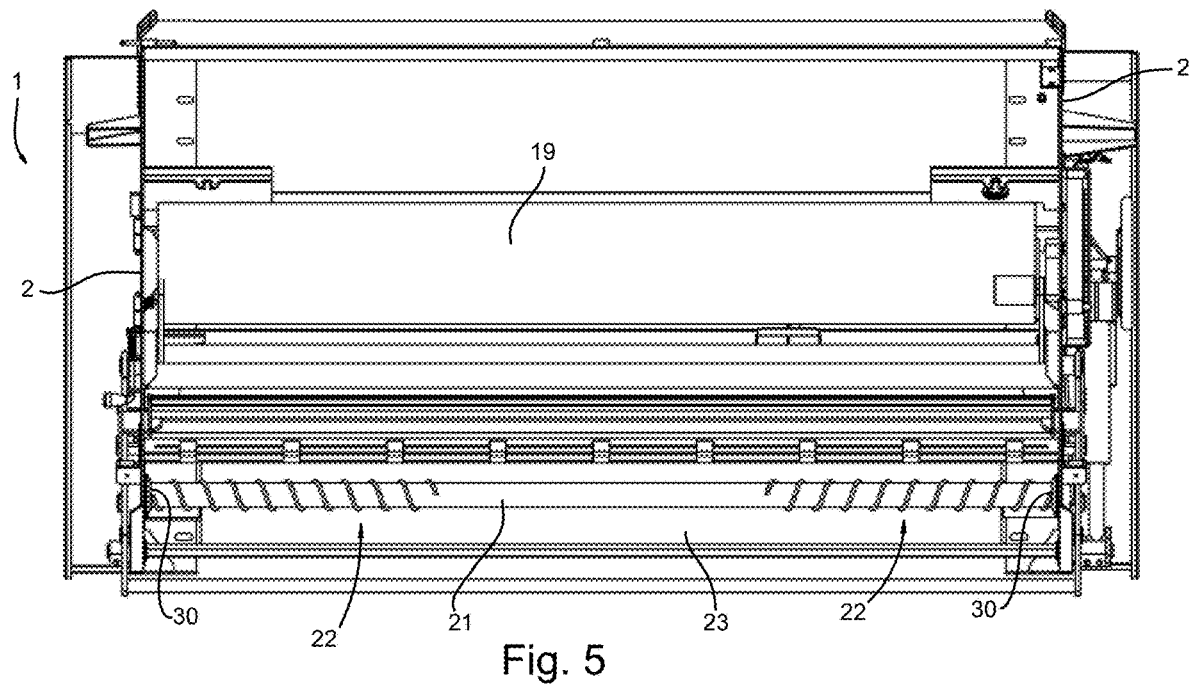
FIG. 5 shows a view of the inside of a tying arrangement inside of which a portion of the mechanism of the present invention is arranged.
Figure 6:
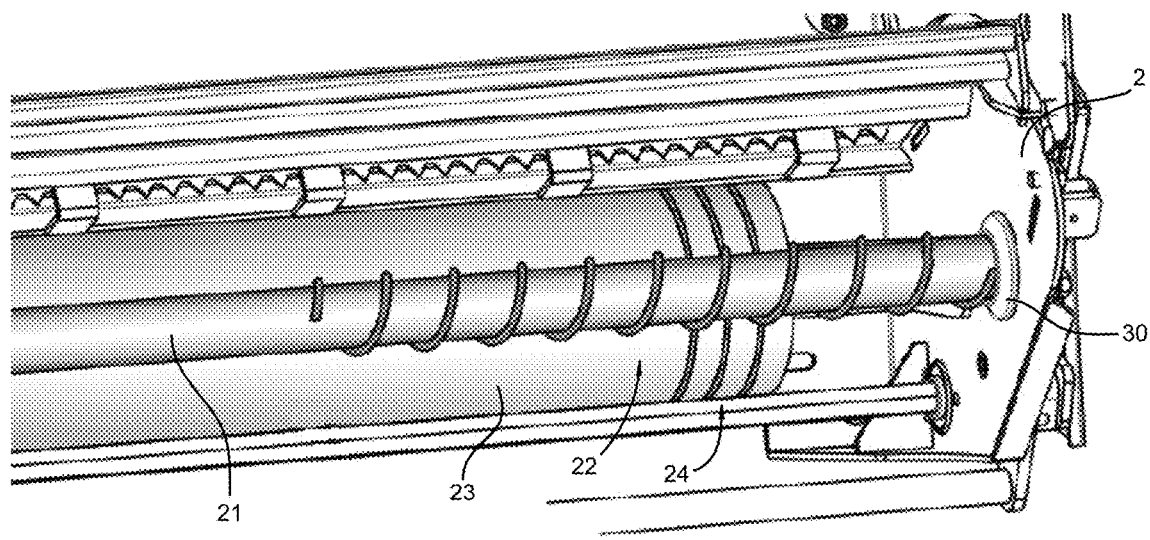
FIG. 6 shows a perspective view of a portion of the tying mechanism of the present invention.

Thus, and according to FIGS. 1 to 8, the mechanism for tying edges of roll bale may be used in a round baler machine 1. In the case of the present invention it was opted for illustrating a round baler, this is not limiting for the invention, since the object hereof may be considered, adapted and used in different types of baler machines. The round baler machine 1 comprises a chassis that supports side walls 2 being supported for the transfer through a pair of wheels 3. A lance 4 protrudes towards the front of the chassis, from where a traction vehicle exerts the pulling force for the forward movement of the baler machine.

In turn, the side walls 2 are mutually parallel and each forms the limits of a baler-compacting chamber 5 that receives the material to compact through a forage collector mechanism or means 9 that takes the forage 10 from the ground and propels it towards the baler-compacting chamber 5, being its features and designs well known in the art, for which reasons no descriptive details are herein provided. The side walls have portions fixed to the chassis and articulated portions that allow it to pivot to rise and release the back area of the baler machine for extracting the already formed round bale.

Round baler machines have also a round bale formation mechanism 6 consisting on a plurality of rollers and flexible belts 14, described in more detail below. In general, these elements cooperate with the side walls and define the baler-compacting chamber that assumes different sizes and forms through the formation cycle of the round bale. This type of machines are called "variable belts chamber", wherein the baler chamber varies from a small size and quasi-triangular section at the beginning of the baler cycle to a maximum size and cylindrical volume at the end of the cycle, as it may be observed in the sequence illustrated in FIGS. 1 to 4.

Said round bales formation mechanism 6 comprises a plurality of rollers extending laterally and are stationary in relation to the side walls of the structure, wherein such rollers comprise a lower traction roller 7, an upper traction roller 8 and a plurality of free-spinning rollers 11. Likewise, a free-spinning subgroup of rollers 12 is arranged, mounted on a tension arm 13 that pivots in the inner side of the machine to variate the trace of the belts 14 and the size and form of the compaction chamber 5 of the round bales.

Stationary rollers are distributed in a generally circular pattern, between the sides of the baler-compacting chamber, to guide the baler elements (belts 14) which are endless flexible belts linearly driven during the formation of the roll bale 15 and the tying thereof, which is not limiting for the invention because other types of configurations may exist, such as one single endless band, chains and bars, or a multiplicity of stationary rollers.

It is worth noting that a plurality of said belts 14 slacker arm 13 may be provided, which may be articulated in the upper part of the round baler machine and located adjacent on the sides of the baler-compaction chamber 5. As mentioned above, these slacker arms 13 hold the free-spinning rollers 12 in direct contact and position over the round bale 15 during its formation. In addition, the slacker arms 13 are biased variably downwards for the rollers 12 to keep the pressure against the upper part of the round bale 15 in formation. In addition, the track of the endless flexible elements (belts 14) with the slacker arm 13 and cooperatively with the side walls 2 defines the baler-compacting chamber 5. In turn, the baler-compacting chamber 5 is open on its lower front part, and this opening is just on ground level 16 for the collection mechanism 9 to enter the forage 10 from the outside towards the baler chamber 5 while the machine 1 slides across the field.

Moreover, it is worth noting that the power needed to pull the elements in the round baler machine may be supplied from the tractor vehicle through a rotary drive bar, connected to a transmission box located on the chassis of the machine, this being well known and used in the art and therefore no descriptive details are provided in relation thereto. The transmission box is connected through gears, toothed wheels and chains to several rotation elements of the baler apparatus.

Once the round bale 15 reaches its maximum diameter, as it is known in the art of keeping forage, it is desirable that it be tied fixedly before being extracted from the machine. To such end, the baler machine 1 has a tying device 17 for tying the round bales that, in general, has the capacity of tying bales which are not fully formed. Wherein, said tying device 17 is on the lower back area of the round baler 1, causing a tying material 18 to be transferred from a net spool 19 provided in said tying device 17 to the entry of the baler chamber 5 located on the lower front part of the machine 1 before the finished round bale 15 may be wrapped. The net spool 19 is provided with the corresponding tying material to carry out the tying of the roll bale. The tying material may be any material well known in the art, and that serves the practical purpose of the tying process.

The net spool 19 may be operatively connected to a mechanical brake to generate a mechanic "brake" effect that allows tensioning the tying material during the roll bale tying. Said mechanical brake is well known in the art and thus no descriptive details thereof are given. Likewise, the invention is provided with a tray 20 extending from a lower free roller 29 adjacent to the tying arrangement 17 to a free front roller arranged adjacent to an entry 26 of the baler-compacting chamber 5, to be described further below. The tray 20 is slightly located underneath the track of the belts 14 between these two rollers, so that the tying material 18 is transported along the tray 20 to the free front roller.

Thus, and according to one of the object of the present invention, the tying mechanism for roll bale edges presents at least one net extension or stretching spiraled bar 21 arranged on the lower part of said tying arrangement 17, between those side walls 2 and transversally to the machine's forward sense, receiving the tying material 18 from the net spool 19. The spiraled bar 21 is mounted on the side walls 2 through respective couplings 30. In turn, said spiraled bar 21 shows a plurality of helicoid threads 22 that extend towards respective edges thereof, being its trace interrupted at a central portion. The helicoid threads 22 allow the material or tying net 18 to be kept extended throughout its side extension from its exiting from the net spool 19.

On the other hand, the mechanism of the invention is provided with at least one feeder roller 23 arranged nearby said extension spiraled bar 21, which receives tying material from this latter. The feeding roller 23 is provided on its ends with a plurality of spirals 24 that allow the uniform distribution of the tying material 18 across the machine, and is ahead of said spiraled bar 21. The feeder roller 23 is mounted on said chassis transversely to the forward movement of the machine through corresponding supports (not depicted).

Moreover, the invention is provided with at least one traction roller 25 arranged adjacent to the entry 26 of the baler-compaction chamber 5 and which receives the tying material 18 from the feeder roller 23-tray 20. Wherein said traction roller 25 has a length longer than the wide of the baler-compaction chamber in order to secure that the tying extends towards the sides or edges of the roll bale. To this end, the traction roller 25 is also provided on its ends with respective rings 27 each of which has a plurality of fins 28 distributed radially. The section of the rings 27 is higher than the section of the traction roller 25, and thus the fins 28 are above the belts 14, forcing the tying or material or tying net 18 to enter during the tying process the baler-compaction chamber 5 and the forage 10 inside it, so that the tying material 18 covers the edge of the rolls 15. The traction roller 25 is arranged transversal to the forward sense of the baler machine, and at the same time is mounted thereon through a support 31. It is worth recalling that the belts 14 are mounted between the above-mentioned rollers and allow, jointly with the slacker arms the formation and compaction of the rolls, and later, after concluding the formation, its tying.

Thus, the tying material or net 18 exits the net spool 19, passing through the spiraled extension bar 21, feeder roller 23, rear lower free roller 29, tray 20 and traction roller 25 to finally enter the baler-compaction chamber and thus tie-cover the roll bale 15 including the edges thereof. At the conclusion of the roll's tying 15, the tying material is cut 18 and discharged on the ground through the relevant expulsion arrangement well known in the art and therefore no descriptive details thereof are provided.

The mechanism for tying bale edges in rolls of baler machines of the present invention is thus created and constructed, which thanks to the arrangement of the feeder— traction rollers and stretching or extension bar, allows to tie and cover the edges of the rolls so as to ensure the geometry thereof throughout time. Although, the composition of the round baler's structure or its operation has not been described in detail, it is understood that any person with ordinary knowledge in the field would not have trouble understanding that the invention is focused on the mechanism to carry out the tying and protection of the roll bale, being the parts and the operation of the baler machine for the formation of the roll therein, in general, widely known in the art and are sufficiently developed in practice.

I claim:

1. A baler machine comprising:
    a chassis with side walls,
    a forage collector mechanism communicated with a baler-compacting chamber provided with a roll formation mechanism,
    a tying arrangement having a net spool arranged in parallel to a rotation of a bale, and provided with a tying material that circulates from the net spool towards the baler-compaction chamber and a formed bale expulsion arrangement, and
    a mechanism for tying edges of roll bale, the mechanism comprising:
        at least one spiraled extension bar arranged on the lower part of said tying arrangement, which receives the tying material from the net spool and bearing a plurality of helicoid fins;
        at least one feeder roller arranged nearby said at least one spiraled extension bar and receives the tying material from said at least one spiraled extension bar; and
        at least one traction roller arranged adjacent to an entry of the baler-compaction chamber and which receives the tying material from the feeder roller, said traction roller having a traction length larger than the width of the baler compacting chamber.

2. The baler machine of claim 1, wherein said at least one spiraled extension bar is arranged between said side walls and in parallel to a rotation of the bale.

3. The baler machine of claim 1, wherein the helicoid fins of said at least one spiraled extension bar are arranged on both ends of the at least one spiraled extension bar.

4. The baler machine of claim 1, wherein a plurality of spirals are provided on the ends of said at least one feeder roller.

5. The baler machine of claim 1, wherein said at least one feeder roller is arranged closer to the bale than said at least one spiraled extension bar.

6. The baler machine of claim 1, wherein said at least one traction roller has respective rings on its edges, each ring having a plurality of fins distributed radially.

7. The baler machine of claim 6, wherein the radius of said rings is greater than the radius of the traction roller without said rings.

8. The baler machine of claim 1, wherein a tray is provided extending underneath a lower rear free roller and said at least one traction roller and adjacent to the tying arrangement.

* * * * *